United States Patent
Yu et al.

(10) Patent No.: US 10,929,241 B2
(45) Date of Patent: Feb. 23, 2021

(54) SYSTEM AND METHOD TO PROVIDE FILE LEVEL RESTORE

(71) Applicant: EMC IP Holding Company LLC, Hopkinton, MA (US)

(72) Inventors: Jing Yu, Shanghai (CN); Ming Zhang, Shanghai (CN); Boda Lei, Chengdu (CN); Yun Wang, Chengdu (CN); Liang Zheng, ChengDu (CN)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 223 days.

(21) Appl. No.: 16/119,287

(22) Filed: Aug. 31, 2018

(65) Prior Publication Data

US 2020/0042397 A1    Feb. 6, 2020

(30) Foreign Application Priority Data

Aug. 3, 2018 (CN) ......................... 201810880300.1

(51) Int. Cl.
*G06F 17/00*    (2019.01)
*G06F 11/14*    (2006.01)
*G06F 9/455*    (2018.01)

(52) U.S. Cl.
CPC ...... *G06F 11/1451* (2013.01); *G06F 9/45558* (2013.01); *G06F 11/1464* (2013.01); *G06F 11/1469* (2013.01); *G06F 2009/4557* (2013.01); *G06F 2009/45583* (2013.01); *G06F 2009/45595* (2013.01); *G06F 2201/815* (2013.01)

(58) Field of Classification Search
CPC ............... G06F 11/002; G06F 11/1446; G06F 11/1451; G06F 11/1464; G06F 11/1469; G06F 16/13; G06F 16/24; G06F 16/156
USPC ................................. 707/674, 722, 736, 758
See application file for complete search history.

(56) References Cited

U.S. PATENT DOCUMENTS

| | | | |
|---|---|---|---|
| 8,930,423 B1 * | 1/2015 | Surampudi ........... | G06F 16/188 707/821 |
| 9,495,404 B2 * | 11/2016 | Kumarasamy ...... | G06F 11/1469 |
| 2008/0120353 A1 * | 5/2008 | Kwon ................. | G06F 11/1417 |
| 2014/0046900 A1 * | 2/2014 | Kumarasamy ...... | G06F 11/1489 707/620 |
| 2014/0201151 A1 * | 7/2014 | Kumarasamy ........ | G06F 16/168 707/646 |
| 2014/0201162 A1 * | 7/2014 | Kumarasamy ...... | G06F 11/1469 707/679 |

(Continued)

*Primary Examiner* — Hung D Le
(74) *Attorney, Agent, or Firm* — Womble Bond Dickinson (US) LLP (57) ABSTRACT

A method and system for providing file level restore (FLR) service for restoring one or more files stored in a plurality of file systems in a backup of a first virtual machine is provided. The method creates a FLR session for a user, including: creating a virtual disk file in a second virtual machine providing the FLR service, the virtual disk file including an empty file system being mounted as a root folder of a virtual appliance in the second virtual machine; creating a respective folder for each of the plurality of file systems under the root folder; mounting each of the plurality of file systems to the respective folder; and mounting the root folder to a folder of the second virtual machine. The method restores the one or more files by the user through accessing the folder of the second virtual machine in the FLR session.

20 Claims, 6 Drawing Sheets

(56) References Cited

U.S. PATENT DOCUMENTS

2017/0235758 A1\* 8/2017 Gopalapura Venkatesh ................
                                                    G06F 3/0664
                                                       707/625
2018/0157561 A1\* 6/2018 Venkatesh .................. G06F 8/65
2019/0095455 A1\* 3/2019 Barreto ............... G06F 11/1446

\* cited by examiner

SYSTEM AND METHOD TO PROVIDE FILE LEVEL RESTORE

TECHNOLOGICAL FIELD

The present disclosure relates generally to providing file level restore, and in particular, to providing file level restore as a service in cloud.

BACKGROUND

Data protection capability becomes more and more important when the enterprises evaluate the solutions from the cloud service providers. One important capability is to provide file level restore (FLR) on virtual machine (VM) image-level backups for cloud service subscribers (tenants). FLR brings the capability to restore individual files in the virtual disks from the image-level VM backup without restoring the entire VM or whole disk. FLR can improve user experience and reduce the restore time from hours to minutes or even seconds. On the other hand, FLR can also significantly reduce CPU, memory, disk I/O and network bandwidth consumption during restoring.

Currently, FLR for image-level VM backup is available in VMWare solutions by leveraging VMWare software development kits (SDKs) such as vSphere SDK and virtual disk development kit (VDDK). However, there is no FLR solution for infrastructure as a service (IaaS) in cloud with Kernel-based Virtual Machine (KVM) or Xen hypervisor or other hypervisors. Cloud service subscribers or tenants can only perform full image-level restoring for the data volumes in KVM and Xen based cloud environment.

Therefore, it would be desirable to have a system and method that takes into account at least some of the issues discussed above, as well as other possible issues.

BRIEF DESCRIPTION OF THE DRAWING(S)

Having thus described example implementations of the disclosure in general terms, reference will now be made to the accompanying drawings, which are not necessarily drawn to scale, and wherein:

DETAILED DESCRIPTION

Example implementations of the present disclosure are directed to providing file level restore as a service in cloud. Example implementations can provide FLR as a service in cloud that is hypervisor-independent for vSphere, KVM, Xen or other hypervisors, storage-independent for logical volume management (LVM), VNX storage, Ceph storage or other storage, and transport-independent based on IP or fibre channel (FC). The cloud service subscribers or tenants can browse and download the files and folders via application programming interface (API) or web user interface (UI) without restoring the entire VM or whole disk.

The present disclosure thus includes, without limitation, the following example implementations.

Some example implementations provide a method of providing file level restore (FLR) service for restoring one or more files stored in a plurality of file systems in a backup of a first virtual machine, the method comprising: creating a FLR session for a user, including: creating a virtual disk file in a second virtual machine providing the FLR service, the virtual disk file including an empty file system being mounted as a root folder of a virtual appliance in the second virtual machine; creating a respective folder for each of the plurality of file systems under the root folder; mounting each of the plurality of file systems to the respective folder; and mounting the root folder to a folder of the second virtual machine; and restoring the one or more files by the user through accessing the folder of the second virtual machine in the FLR session.

In some example implementations of the method of any preceding example implementation, or any combination of preceding example implementations, wherein the first virtual machine and the second virtual machine are deployed in a cloud.

In some example implementations of the method of any preceding example implementation, or any combination of preceding example implementations, wherein creating the respective folder for each of the plurality of file systems includes generating a respective name for each of the plurality of file systems, the respective name being displayed to the user.

In some example implementations of the method of any preceding example implementation, or any combination of preceding example implementations, wherein a life cycle of the FLR session is controlled by a plurality of timers.

In some example implementations of the method of any preceding example implementation, or any combination of preceding example implementations, the method further comprising providing a token to the user to allow the user to access the folder of the second virtual machine in the FLR session.

In some example implementations of the method of any preceding example implementation, or any combination of preceding example implementations, wherein restoring the one or more files includes browsing or downloading the one or more files.

In some example implementations of the method of any preceding example implementation, or any combination of preceding example implementations, wherein restoring the one or more files includes restoring the one or more files without restoring the entire backup of the first virtual machine.

Some example implementations provide an apparatus for providing file level restore (FLR) service for restoring one or more files stored in a plurality of file systems in a backup of a first virtual machine, the apparatus comprising a processor and a memory storing executable instructions that, in response to execution by the processor, cause the apparatus to at least: create a FLR session for a user, including causing the apparatus to:

create a virtual disk file in a second virtual machine providing the FLR service, the virtual disk file including an empty file system being mounted as a root folder of a virtual appliance in the second virtual machine; create a respective folder for each of the plurality of file systems under the root folder; mount each of the plurality of file systems to the respective folder; and mount the root folder to a folder of the second virtual machine; wherein the FLR session enables restoring the one or more files by the user through accessing the folder of the second virtual machine in the FLR session.

Some example implementations provide a computer-readable storage medium for providing file level restore (FLR) service for restoring one or more files stored in a plurality of file systems in a backup of a first virtual machine, the computer-readable storage medium being non-transitory and having computer-readable program code stored therein that in response to execution by a processor, causes an apparatus to at least: create a FLR session for a user, including causing the apparatus to: create a virtual disk file in a second virtual machine providing the FLR service, the virtual disk file including an empty file system being mounted as a root folder of a virtual appliance in the second virtual machine; create a respective folder for each of the plurality of file systems under the root folder; mount each of the plurality of file systems to the respective folder; and mount the root folder to a folder of the second virtual machine; wherein the FLR session enables restoring the one or more files by the user through accessing the folder of the second virtual machine in the FLR session.

These and other features, aspects, and advantages of the present disclosure will be apparent from a reading of the following detailed description together with the accompanying drawings, which are briefly described below. The present disclosure includes any combination of two, three, four or more features or elements set forth in this disclosure, regardless of whether such features or elements are expressly combined or otherwise recited in a specific example implementation described herein. This disclosure is intended to be read holistically such that any separable features or elements of the disclosure, in any of its aspects and example implementations, should be viewed as combinable unless the context of the disclosure clearly dictates otherwise.

It will therefore be appreciated that this Brief Summary is provided merely for purposes of summarizing some example implementations so as to provide a basic understanding of some aspects of the disclosure. Accordingly, it will be appreciated that the above described example implementations are merely examples and should not be construed to narrow the scope or spirit of the disclosure in any way. Other example implementations, aspects and advantages will become apparent from the following detailed description taken in conjunction with the accompanying drawings which illustrate, by way of example, the principles of some described example implementations.

Some implementations of the present disclosure will now be described more fully hereinafter with reference to the accompanying drawings, in which some, but not all implementations of the disclosure are shown. Indeed, various implementations of the disclosure may be embodied in many different forms and should not be construed as limited to the implementations set forth herein; rather, these example implementations are provided so that this disclosure will be thorough and complete, and will fully convey the scope of the disclosure to those skilled in the art. For example, unless otherwise indicated, reference something as being a first, second or the like should not be construed to imply a particular order. Also, something may be described as being above something else (unless otherwise indicated) may instead be below, and vice versa; and similarly, something described as being to the left of something else may instead be to the right, and vice versa. Like reference numerals refer to like elements throughout.

Example implementations of the present disclosure are generally directed to providing file level restore, and in particular, to providing file level restore as a service in cloud.

Figure 1:
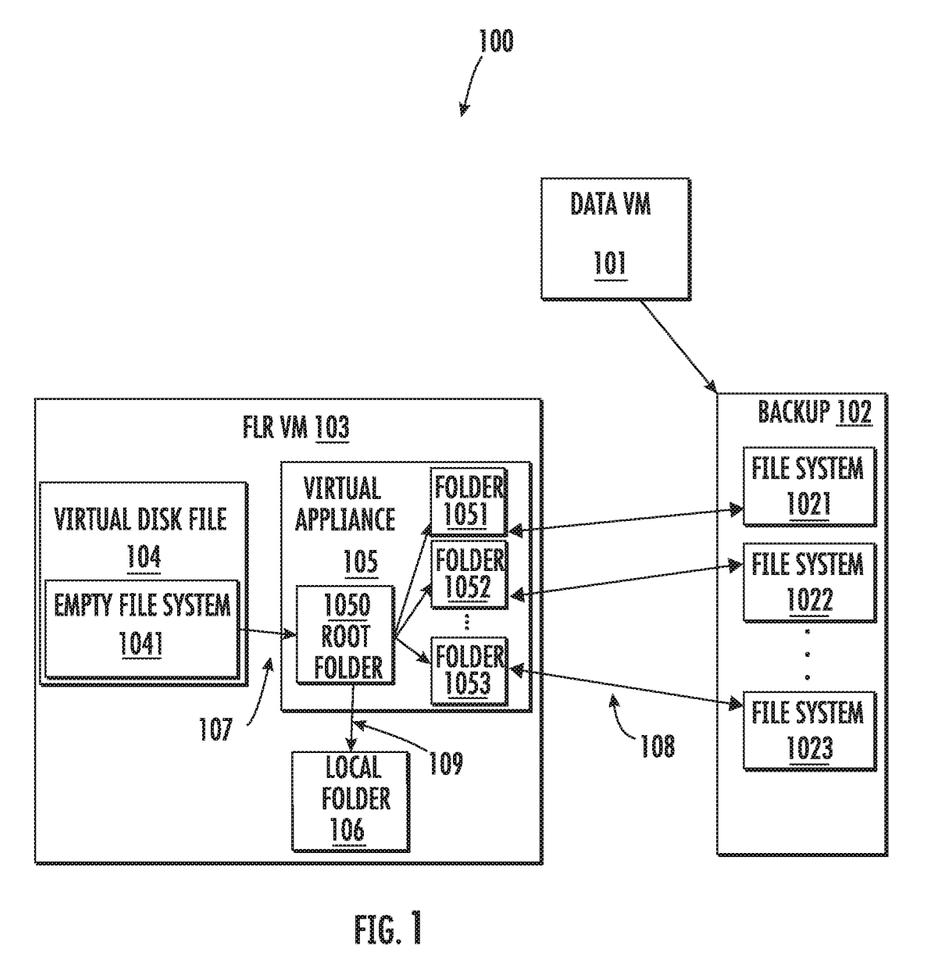
FIG. 1 illustrates a system for providing FLR service, according to example implementations of the present disclosure.

FIG. 1 illustrates a system 100 for providing FLR service, according to example implementations of the present disclosure. In some examples, as described in greater detail with reference to FIG. 6, the system may be implemented by an apparatus that includes a processor and a memory storing executable instructions.

As shown, the system 100 includes any of a number of different subsystems (each an individual system) for performing one or more functions or operations. As shown, in some examples, the system includes one or more of each of a data virtual machine (VM) 101, an image-level backup 102 of the data VM and a FLR VM 103. The subsystems may be co-located or directly coupled to one another, or in some examples, various ones of the subsystems may communicate with one another across one or more computer networks. Further, although shown as part of the system, it should be understood that any one or more of the data VM, image-level backup or FLR VM may function or operate as a separate system without regard to any of the other subsystems. It should also be understood that the system may include one or more additional or alternative subsystems than those shown in FIG. 1. In one implementation, the data VM and the FLR VM are deployed in a cloud environment and may be deployed in a server of the cloud service provider.

In some implementations, the data VM 101 has the image-level backup 102, which can be stored in a storage element. The data VM may have multiple image-level backups including backup data of the data VM at different times or dates. The image-level backup includes a plurality of file systems, e.g., file systems 1021, 1022 and 1023, as shown in FIG. 1. Each of the plurality of file systems includes one or more files that the user may need to restore.

The FLR VM 103 is configured to provide FLR service for restoring one or more files stored in the plurality of file systems 1021, 1022 and 1023 in the image-level backup 102 of the data VM 101. In some implementations, the FLR VM is configured to create a FLR session for the user upon the user's request to restore one or more files. To create the FLR session for the user, the FLR VM creates a virtual disk file 104, which may include an operating system (OS) disk. The FLR VM is configured to create an empty file system 1041 in the virtual disk file. The empty file system is mounted as a root folder 1050 of a virtual appliance 105 in the FLR VM, as indicated by arrow 107. The root folder may have a path name "/". When created, the empty file system in the virtual disk file does not include any file. The virtual appliance can be a separate VM in the FLR VM.

In some implementations, the virtual appliance 105 is configured to create a respective folder for each of the plurality of file systems 1021, 1022 and 1023 under the root folder 1050. For example, as shown, the virtual appliance can create a folder 1051 for the file system 1021, a folder 1052 for the file system 1022, and a folder 1053 for the file system 1023. The folders 1051, 1052 and 1053 are created under the root folder, thus, the root folder includes the folders 1051, 1052 and 1053.

In one implementation, to create the folders 1051, 1052 and 1053 for the plurality of file systems 1021, 1022 and 1023 under the root folder 1050, the virtual appliance 105 is configured to generate a respective name for each of the plurality of file systems, the respective name being displayed to the user. Generating the names for the plurality of file systems will be described in details below.

In one example, the image-level backup 102 includes multiple virtual disks with an order of the disk. Each of the multiple virtual disks includes multiple partitions with an order of the partitions. Each of the multiple partitions includes one of the plurality of file systems 1021, 1022 and 1023. When the virtual appliance 105 creates folders 1051, 1052 and 1053 for the plurality of file systems under the root folder 1050, the created folders maintain the same order of the disk and the same order of the partitions.

In some implementations, the virtual appliance 105 is configured to mount each of the plurality of file systems 1021, 1022 and 1023 in the image-level backup 102 to the respective folder 1051, 1052 and 1053 created under the root folder 1050, as indicated by arrows 108. That is, each of the file systems in the image-level backup is mounted to a respective folder created under the root folder.

The virtual appliance is configured to mount the root folder 1050 to a local folder 106 of the FLR VM 103, as indicated by arrow 109. After the root folder is mounted to the local folder, a FLR session has been created for the user. The FLR session enables restoring the one or more files by the user through accessing the local folder of the FLR VM in the FLR session.

In one implementation, the user can restore the one or more files stored in the plurality of file systems 1021, 1022 and 1023 in the image-level backup 102 through accessing the local folder 106 of the FLR VM 103 in the FLR session. For example, the user can access the local folder to access the root folder 1050 to access the folders 1051, 1052 and 1053 to find the files in the plurality of file systems to be restored. The user restores the one or more files by browsing or downloading the one or more files through accessing the local folder 106. The FLR session enables the user to restore only the one or more files without restoring the entire image-level backup of the data VM 101.

In some implementations, the virtual appliance 105 is configured to provide a token to the user to allow the user to access the local folder 106 of the FLR VM 103 in the FLR session, which will be described in details in FIG. 2 below.

In some implementations, a life cycle of the FLR session is controlled by a plurality of timers. In one example, the FLR VM 103 uses three timers for life cycle control of a FLR session. The first timer can be an initial-access timer (IAT, e.g., 2 hours) that controls the timeout between the session creation and first access to the folder 106. The second timer can be a keep-alive timer (KAT, e.g., 15 minutes) to control the timeout between two browse/download operations by the user. The third timer can be a life-time timer (LTT, e.g., 8 hours) to control the entire FLR session life time. In one example, the user can specify the values of the timers in the user's request to create a FLR session. In another example, the FLR VM may also use default values of the timers.

In one example, when the session is created, IAT and LTT are started together. If there is a browse/download request and IAT is active, IAT will be stopped and KAT will be started. If there is another browse/download request during an active KAT and IAT has been stopped, KAT will be restarted. The FLR session will be ended automatically upon the timeout of any of the three timers.

Figure 2:
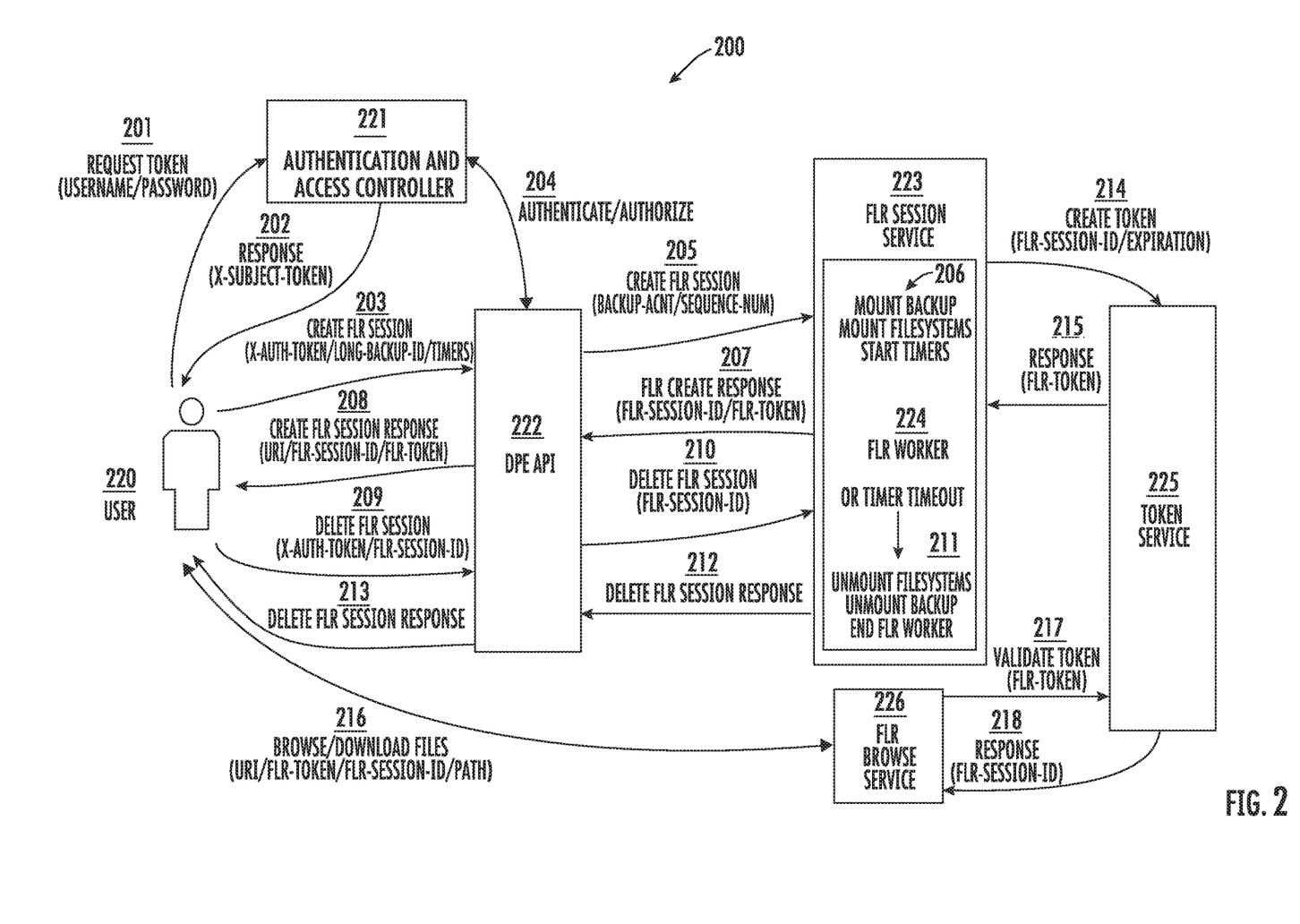
FIG. 2 illustrates a process of providing FLR service, according to one example implementation.

FIG. 2 illustrates a process 200 of providing FLR service, according to one example implementation. As shown, a user 220 such as a service subscriber or tenant having a cloud account can request a token from an authentication and access controller 221, as indicated by arrow 201. The token may include information for the user to creating a FLR session, browsing or downloading files and/or deleting a FLR session. The authentication and access controller responds to the user with the requested token, as indicated by arrow 202. In one example, the authentication and access controller may be VMWare Keystone.

In some implementations, after receiving the token, the user 220 can create a FLR session by sending a request with the token to a distributed processing environment (DPE) API 222, as indicated by arrow 203. The authentication and access controller 221 will authenticate or authorize the request based on the token in the request, as indicated by arrow 204. After the user' request to create a FLR session has been authenticated or authorized, the DEP API will send a message to FLR session service 223 to create the FLR session for the user, as indicated by arrow 205. The FLR session service starts a FLR worker 224 to mount the backup 102 of the data VM 101, mount file systems in the backup and start timers for life control to create the FLR session, as indicated by arrow 206. The FLR worker sends a response to the DPE API, as indcted by arrow 207. The DPE API sends a response to the user indicating that the FLR session has been created for the user, as indicated by arrow 208.

The user 220 can browse/download files in the FLR session. In one example, the request to browse or download files includes the token provided by the authentication and access controller 221. The authentication and access controller will authenticate or authorize the request based on the token in the request.

After the user restores the files, the user 220 can send a request to the DPE API 222 to delete the FLR session, as indicated by arrow 209. The request to delete the FLR session also includes the token provided by the authentication and access controller 221. The authentication and access controller 221 also authenticate or authorize the request based on the token in the request. The DPE API will send a message to the FLR session service 223 to delete the FLR session. In one example, the FLR work 224 will delete the FLR session after receiving the message from the DPE API. In another example, the FLR work will automatically delete the FLR session if any of the timers is timeout, as explained above. The FLR worker will unmount the file systems, unmount the backup 102, and end the FLR worker to delete the FLR session, as indicated by arrow 211. The FLR session service will send a response to the DPE API, as indicated by arrow 212. The DPE API will send a response to the user indicating that the FLR session has been deleted, as indicated by arrow 213.

In one example, only a user with a cloud account can initiate the operations indicated by arrows 201, 203 and 209. If a user does not have a cloud account, such user cannot get the token from the authentication and access controller 221. Assuming the user 220 does not have a cloud account, to allow the user without a cloud account to restore files using the FLR service, a FLR token is created for the user. Also, such user needs to get a uniform resource identifier (URI), a FLR session ID and the FLR token to restore the files.

In one implementation, assuming the user 220 does not have a cloud account, the user 220 can request FLR service on a backup 120 of a data VM 101 through a customer built system with a portal or other vehicles like email, ticket system. After authentication and authorization, the customer built system will use the service account (e.g., backup_admin) to get the token of cloud platform. The FLR session service 223 can send a message to a token service 225 to create the FLR token, as indicated by arrow 214. The token service will respond to the FLR session service with the FLR token, as indicated by arrow 215. The customer built system can then create an FLR session with this token along with a set of timers to control life time of the FLR session. The FLR session service will create the session and return the URI, FLR session ID and FLR token for the user. The customer built system will provide the URI, FLR session ID and FLR token to the user. The user can be redirected to the FLR, URI and login with FLR session ID and FLR token to browse and/or download files through the FLR browse service 226, as indicated by arrow 216. The FLR browse service can validate or verify the FLR token from the token service, as indicated by arrow 217. The token service can send response of validation or verification to the FLR browse service, as indicated by arrow 218.

Figure 3:
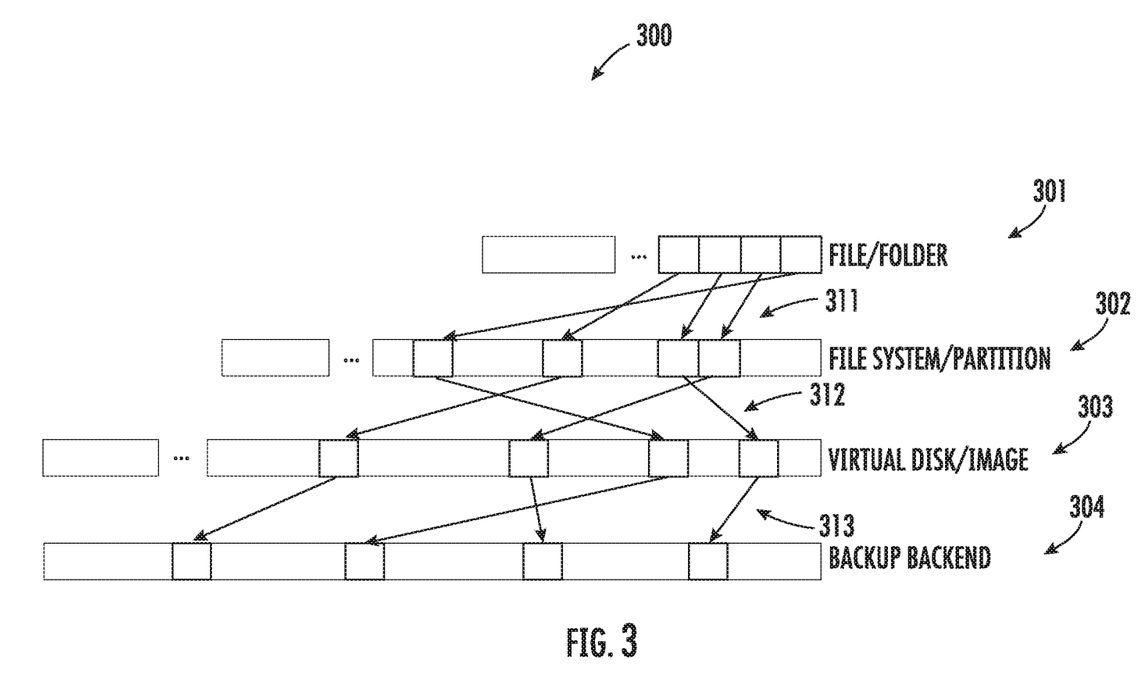
FIG. 3 illustrates a mapping of storage blocks at different tiers, according to another example implementation.

FIG. 3 illustrates a mapping 300 of storage blocks at different tiers, according to another example implementation. Restoring files includes read operations. To restore a file from an image-level backup, there are multiple steps of address translations. As shown in FIG. 3, from top to bottom, a file 301 includes blocks in file system. A file system is built on a partition 302, which could be physical or logical such as LVM or device manager (DM) devices or combined. The blocks in the file 301 have a mapping relationship with the blocks in the partition 302, as indicated by arrows 311. Partitions are on virtual disks 303. The blocks in the partition 302 have a mapping relationship with the blocks in the virtual disks 303, as indicated by arrows 312. Virtual disks are stored in backup backend 304. Similarly, the blocks in the virtual disks 303 have a mapping relationship with the blocks in the backup backend 304, as indicated by arrows 313. A reading operation of an offset or length of a file needs to be translated into addresses in the file system, then addresses in the virtual disk and finally addresses in the backup backend. In one example, there can be more tiers which are not shown in FIG. 3.

To restore a file, the FLR service performs the translation in a reverse order. For example, the FLR VM 103 first mounts the backup 102 into a folder of FLR appliance using a tool, e.g., Avamar axionfs. This process can expose the raw disk images in the backup as files and translate reading operations of images to reading operations of chunks in the backup backend. Using axionfs can perform the translation from the backup backend 304 to the virtual disks 303. Then the file systems inside the images can be mounted into another folder using a tool, e.g., libguestfs. This process can translate reading operations of files to reading operations of images. Using libguestfs can perform the translation from the virtual disks 303 to the partition 302, and from the partition 302 to the file 301. In one example, the process of translation in the reverse order includes creating a folder for the backup, mounting the backup to the folder using axionfs, creating another folder for file systems 1021, 1022 and 1023, and mounting the file systems to the other folder using libguestfs.

For the translation in the reversed order as described above, some additional considerations are needed. One additional consideration is that the FLR VM 103 needs to list or display the file systems, e.g., the file systems 1021, 1022 and 1023 in the backup 102, to the user 220. For the virtual disks which are currently mounted, the mount points (path) are used directly for displaying to the user.

If a file system is not mounted, or the guest agent is not installed, the virtual appliance 105 is configured to generate a respective name for each of the plurality of file systems 1021, 1022 and 1023 using a combination of:

(Label/Device ID)+(File System Type)+(Partition Size)

The above information can be detected by libguestfs and be combined together so the user 220 can easily recognize which partition/filesystem that the user is browsing. One example of the names for the plurality of file systems are shown below:

| Device | VFS | Label | Size |
|---|---|---|---|
| /dev/sda1 | ext4 | - | 4.0G |
| /dev/sdb7 | btrfs | - | 1.0G |
| /dev/sdb8 | ext4 | test-label | 1.0G |
| /dev/sdb9 | xfs | - | 1.0G |
| /dev/vg-libguestfs-test/lv1-8g | ext4 | - | 8.0G |
| /dev/vg-libguestfs-test/lv2-8g | btrfs | - | 8.0G |
| /dev/vg-libguestfs-test/lv3-8g | reiserfs | - | 8.0G |
| /dev/vg-libguestfs-test/lv4-8g | xfs | - | 8.0G |

Output: List of device, fs_id pair
[('/dev/sda1', 'sda1__ext4__4.0G'),
('/dev/sdb7', 'sdb7__btrfs__1.0G'),
('/dev/sdb8', 'test-label__ext4__1.0G'),
('/dev/sdb9', 'sdb9__xfs__1.0G'),
('/dev/vg-libguestfs-test/lv1-8g', 'vg-libguestfs-test.lv1-8g__ext4__8.0G'),
('/dev/vg-libguestfs-test/lv2-8g', 'vg-libguestfs-test.lv2-8g__btrfs__8.0G'),
('/dev/vg-libguestfs-test/lv3-8g',
'vg-libguestfs-test.lv3-8g__reiserfs__8.0G'),
('/dev/vg-libguestfs-test/lv4-8g', 'vg-libguestfs-test.lv4-8g__xfs__8.0G')]

Another additional consideration is that mounting file systems inside a disk image directly to a local folder of the FLR VM 103 is not safe. One failure may affect the entire FLR appliance. Thus the FLR VM 103 uses libguestfs to mount the filesystems in user mode. Libguestfs starts the virtual appliance 105 to mount file systems inside the image-level backup 102 to the root folder 1050, and then expose the root folder 1050 "/" to a local folder 106 in the local file system. Libguestfs can mount each file system separately, which means that libguestfs will start multiple virtual appliances for multiple file systems which will cost large memory (around 300 MB each) and slow down the mount process for several seconds. For example, if there are eight file systems to mount, more than 2 GB memory will be used and it can take one minute to mount all the eight file systems.

To reduce the cost of memory and the time of the mounting process, the FLR VM 13 is configured to create an empty file system 1041 in the virtual disk file 104. The empty file system is mounted as a root folder 1050 of the virtual appliance 105, as indicated by arrow 107. The virtual appliance 105 adds the virtual disk file 104 as the first disk and then adds the actual disk images mounted from the backup 102 in the same order as they are in the backup.

In one implementation, during mounting, a new overlay layer, e.g., a QEMU overlay layer, will be created on top of the dummy OS disk 104 and the overlay layer is writable. The dummy OS disk will be mounted to a root folder "/" 1050 in libguestfs, then folders 1051, 1052 and 1053 are created according to the display names of each of the file systems 1021, 1022 and 1023 under the "/" folder and the file systems are mounted to the folders. The "/" folder will be mounted to a local folder 106 on a local file system. Each sub-folder under the "/" folder is a file system in the backup. The user can access the files under the "/" folder through the overlay layer.

Figure 4:
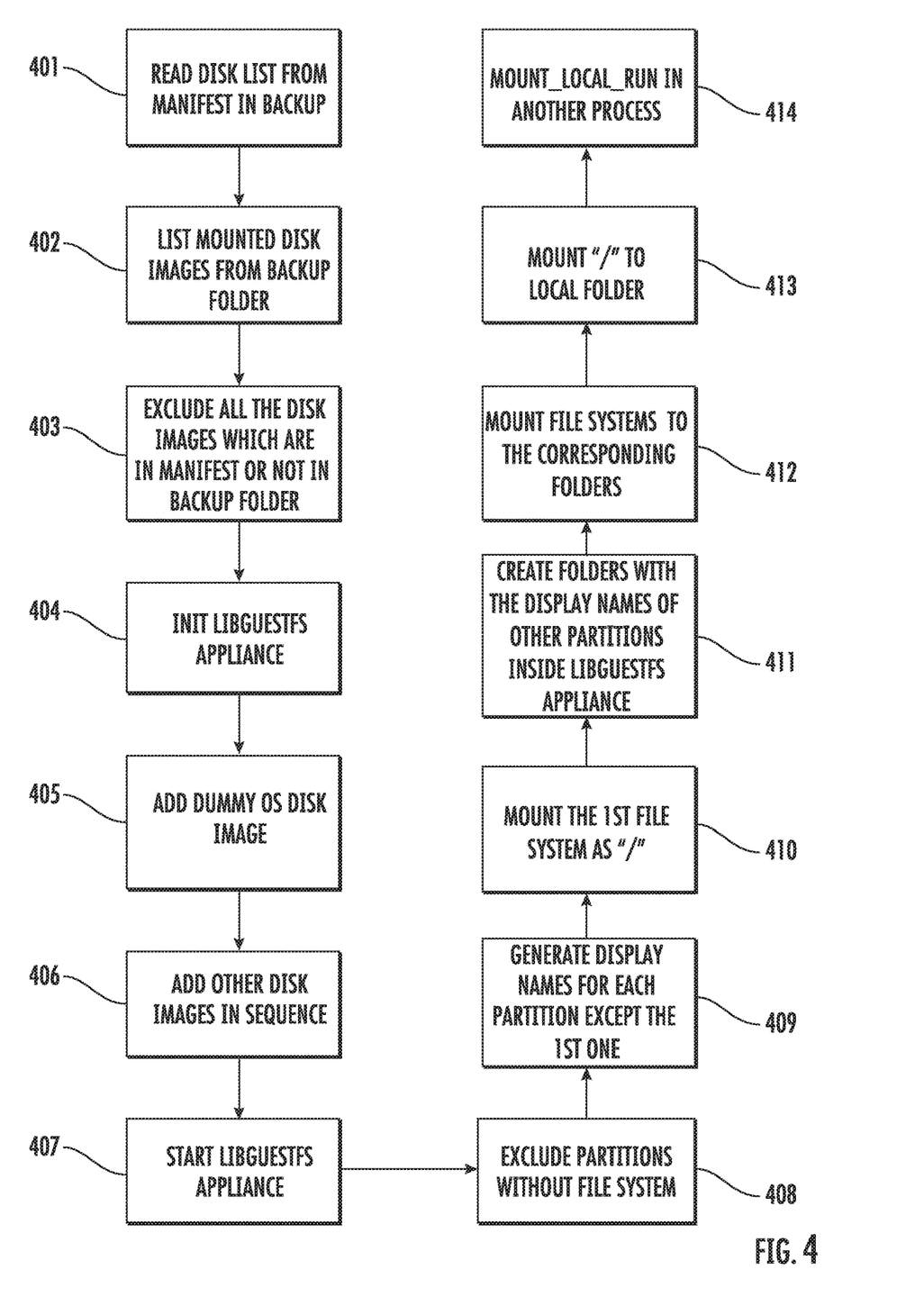
FIG. 4 illustrates a flowchart of mounting file systems, according to various example implementations.

FIG. 4 illustrates a flowchart 400 of mounting file systems, according to various example implementations. As shown, at block 401, the FLR VM 103 reads a disk list from manifest in the backup 102. At block 402, the FLR VM lists mounted disk images from the backup folder. At block 403, the FLR VM excludes all the disk images which are not in manifest or not in the backup folder. At block 404, the FLR VM initiates the virtual appliance 105 which may be a libguestfs appliance. The FLR VM adds dummy OS disk image 104 and adds other disk images in sequence or in the same order of the disk images as they are in the backup, as shown at blocks 405 and 406.

At block 407, the FLR VM 103 starts the libguestfs appliance. At block 408, the FLR VM excludes partitions without any file system. At block 409, the FLR VM generates display names for each partition except the first partition including the first file system of the dummy OS disk image. At block 410, the FLR VM mounts the first file system which is an empty file system 1041 as a root folder 1050 "/" of the libguestfs appliance 105. At block 411, the libguestfs appliance creates folders 1051, 1052 and 1053 with the display names of other partitions (except the first partition) inside the libguestfs appliance. At block 412, the libguestfs appliance mounts the file systems 1021, 0122 and 1023 in the partitions to the corresponding folders. At block, 413, the libguestfs appliance mounts the root folder "/" to a local folder 106 of the FLR VM. At block 414, the libguestfs appliance performs mount_local_run in another process. The operation of mount_local_run can start a new process to "serve" the file system operations (e.g., list dir, read file) from the FLR VM 103.

Figure 5:
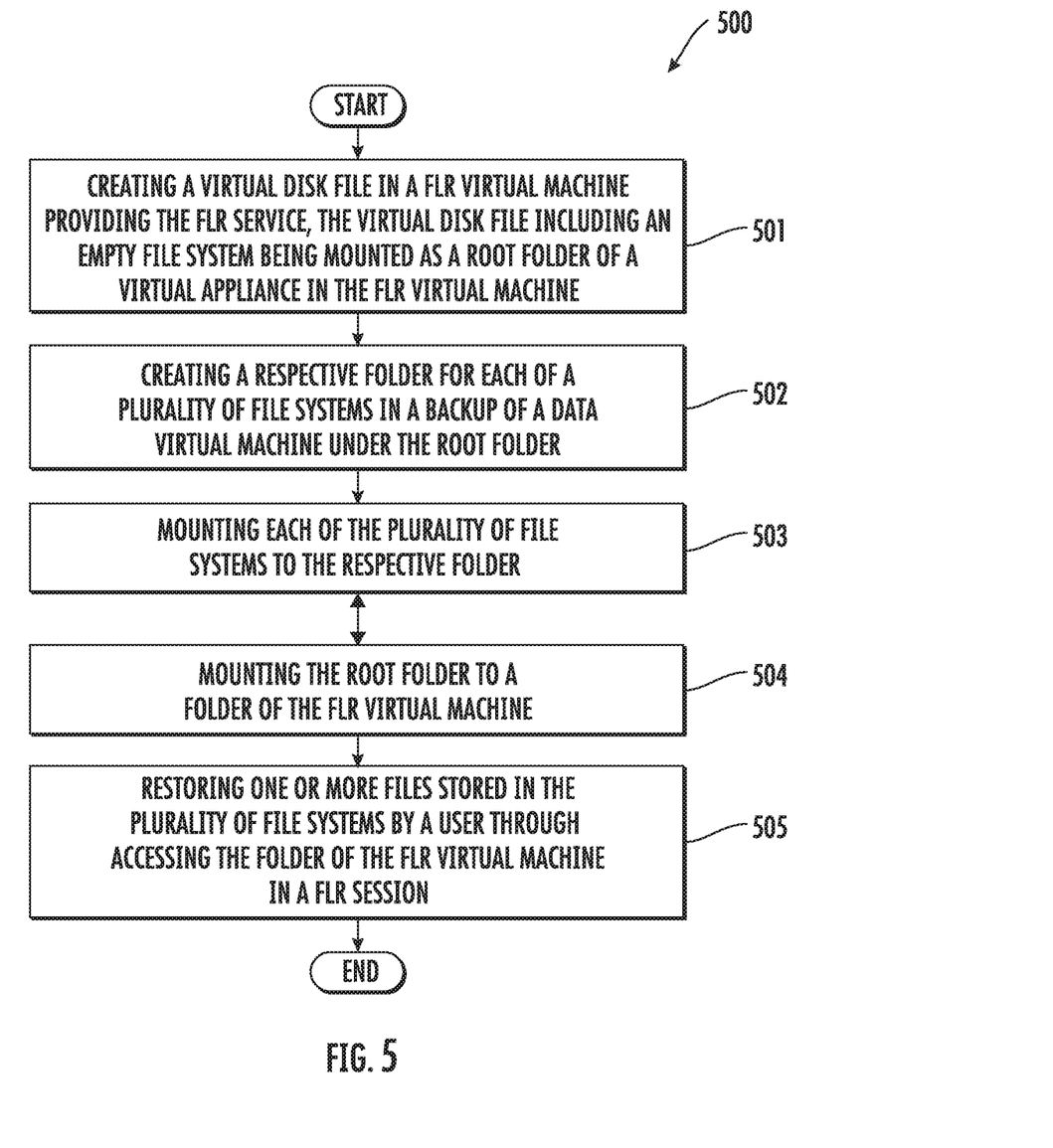
FIG. 5 is a flowchart illustrating various operations in a method of providing FLR service, according to various example implementations.

FIG. 5 is a flowchart illustrating various operations in a method 500 of providing FLR service for restoring one or more files stored in a plurality of file systems in a backup of a data VM, according to various example implementations. The method includes creating a FLR session for a user 220. Creating the FLR session includes creating a virtual disk file 104 in a FLR VM 103, the virtual disk file including an empty file system 1041 being mounted as a root folder 1050 of a virtual appliance 105 in the FLR VM, as shown in block 501. Creating the FLR session also includes creating a respective folder (e.g., folders 1051, 1052 and 1053) for each of the plurality of file systems (e.g., 1021, 1022 and 1023) in a backup 102 of a data VM 101 under the root folder and mounting each of the plurality of file systems to the respective folder, as shown in blocks 502 and 503. Creating the FLR session further includes mounting the root folder to a folder 106 of the FLR VM, as shown in block 504. After the FLR session is created, the method includes restoring the one or more files by the user through accessing the folder 106 of the FLR VM in the FLR session, as shown in block 505.

Figure 6:
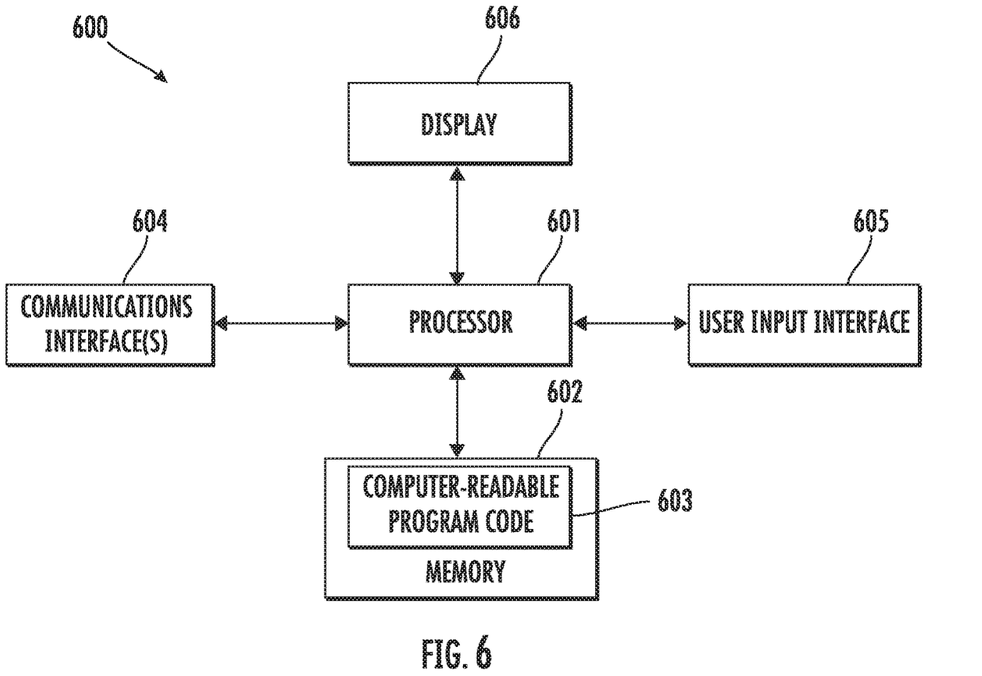
FIG. 6 illustrates an apparatus according to some example implementations.

FIG. 6 illustrates an apparatus 600 according to some example implementations. Generally, an apparatus of exemplary implementations of the present disclosure may comprise, include or be embodied in one or more fixed or portable electronic devices. Examples of suitable electronic devices include a smartphone, tablet computer, laptop computer, desktop computer, workstation computer, server computer or the like. The apparatus may include one or more of each of a number of components such as, for example, processor 601 (e.g., processing circuitry) connected to a memory 602 (e.g., storage device). In some examples, the apparatus 600 implements the system 100.

The processor 601 may be composed of one or more processors alone or in combination with one or more memories. The processor is generally any piece of computer hardware that is capable of processing information such as, for example, data, computer programs and/or other suitable electronic information. The processor is composed of a collection of electronic circuits some of which may be packaged as an integrated circuit or multiple interconnected integrated circuits (an integrated circuit at times more commonly referred to as a "chip"). The processor may be configured to execute computer programs, which may be stored onboard the processor or otherwise stored in the memory 602 (of the same or another apparatus).

The processor 601 may be a number of processors, a multi-core processor or some other type of processor, depending on the particular implementation. Further, the processor may be implemented using a number of heterogeneous processor systems in which a main processor is present with one or more secondary processors on a single chip. As another illustrative example, the processor may be a symmetric multi-processor system containing multiple processors of the same type. In yet another example, the processor may be embodied as or otherwise include one or more ASICs, FPGAs or the like. Thus, although the processor may be capable of executing a computer program to perform one or more functions, the processor of various examples may be capable of performing one or more functions without the aid of a computer program. In either instance, the processor may be appropriately programmed to perform functions or operations according to example implementations of the present disclosure.

The memory 602 is generally any piece of computer hardware that is capable of storing information such as, for example, data, computer programs (e.g., computer-readable program code 603) and/or other suitable information either on a temporary basis and/or a permanent basis. The memory may include volatile and/or non-volatile memory, and may be fixed or removable. Examples of suitable memory include random access memory (RAM), read-only memory (ROM), a hard drive, a flash memory, a thumb drive, a removable computer diskette, an optical disk, a magnetic tape or some combination of the above. Optical disks may include compact disk-read only memory (CD-ROM), compact disk-read/write (CD-R/W), DVD or the like. In various instances, the memory may be referred to as a computer-readable storage medium. The computer-readable storage medium is a non-transitory device capable of storing information, and is distinguishable from computer-readable transmission media such as electronic transitory signals capable of carrying information from one location to another. Computer-readable medium as described herein may generally refer to a computer-readable storage medium or computer-readable transmission medium.

In addition to the memory 602, the processor 601 may also be connected to one or more interfaces for displaying, transmitting and/or receiving information. The interfaces may include a communications interface 604 (e.g., communications unit) and/or one or more user interfaces. The communications interface may be configured to transmit and/or receive information, such as to and/or from other apparatus(es), network(s) or the like. The communications interface may be configured to transmit and/or receive information by physical (wired) and/or wireless communications links. Examples of suitable communication interfaces include a network interface controller (NIC), wireless NIC (WNIC) or the like.

The user interfaces may include a display 606 and/or one or more user input interfaces 605 (e.g., input/output unit). The display may be configured to present or otherwise display information to a user, suitable examples of which include a liquid crystal display (LCD), light-emitting diode display (LED), plasma display panel (PDP) or the like. The user input interfaces may be wired or wireless, and may be configured to receive information from a user into the apparatus, such as for processing, storage and/or display.

Suitable examples of user input interfaces include a microphone, image or video capture device, keyboard or keypad, joystick, touch-sensitive surface (separate from or integrated into a touchscreen), biometric sensor or the like. The user interfaces may further include one or more interfaces for communicating with peripherals such as printers, scanners or the like. In some examples, the user interfaces include the GUI 106.

As indicated above, program code instructions may be stored in memory, and executed by processor that is thereby programmed, to implement functions of the systems, subsystems, tools and their respective elements described herein. As will be appreciated, any suitable program code instructions may be loaded onto a computer or other programmable apparatus from a computer-readable storage medium to produce a particular machine, such that the particular machine becomes a means for implementing the functions specified herein. These program code instructions may also be stored in a computer-readable storage medium that can direct a computer, a processor or other programmable apparatus to function in a particular manner to thereby generate a particular machine or particular article of manufacture. The instructions stored in the computer-readable storage medium may produce an article of manufacture, where the article of manufacture becomes a means for implementing functions described herein. The program code instructions may be retrieved from a computer-readable storage medium and loaded into a computer, processor or other programmable apparatus to configure the computer, processor or other programmable apparatus to execute operations to be performed on or by the computer, processor or other programmable apparatus.

Retrieval, loading and execution of the program code instructions may be performed sequentially such that one instruction is retrieved, loaded and executed at a time. In some example implementations, retrieval, loading and/or execution may be performed in parallel such that multiple instructions are retrieved, loaded, and/or executed together. Execution of the program code instructions may produce a computer-implemented process such that the instructions executed by the computer, processor or other programmable apparatus provide operations for implementing functions described herein.

Execution of instructions by a processor, or storage of instructions in a computer-readable storage medium, supports combinations of operations for performing the specified functions. In this manner, an apparatus 600 may include a processor 601 and a computer-readable storage medium or memory 602 coupled to the processor, where the processor is configured to execute computer-readable program code 603 stored in the memory. It will also be understood that one or more functions, and combinations of functions, may be implemented by special purpose hardware-based computer systems and/or processors which perform the specified functions, or combinations of special purpose hardware and program code instructions.

Many modifications and other implementations of the disclosure set forth herein will come to mind to one skilled in the art to which the disclosure pertains having the benefit of the teachings presented in the foregoing description and the associated drawings. Therefore, it is to be understood that the disclosure is not to be limited to the specific implementations disclosed and that modifications and other implementations are intended to be included within the scope of the appended claims. Moreover, although the foregoing description and the associated drawings describe example implementations in the context of certain example combinations of elements and/or functions, it should be appreciated that different combinations of elements and/or functions may be provided by alternative implementations without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A method of providing file level restore (FLR) service for restoring one or more files stored in a plurality of file systems in a backup of a first virtual machine, the method comprising:
 receiving a request from a user to restore the one or more files stored in the plurality of file systems in the backup of the first virtual machine;
 creating a FLR session for the user, including:
  creating a virtual disk file in a second virtual machine providing the FLR service, the virtual disk file including an empty file system being mounted as a root folder of a virtual appliance in the second virtual machine;
  creating a respective folder for each of the plurality of file systems under the root folder;
  mounting each of the plurality of file systems to the respective folder; and
  mounting the root folder to a folder of the second virtual machine; and
 restoring the one or more files by the user through accessing the folder of the second virtual machine in the FLR session.

2. The method of claim 1, wherein the first virtual machine and the second virtual machine are deployed in a cloud.

3. The method of claim 1, wherein creating the respective folder for each of the plurality of file systems includes generating a respective name for each of the plurality of file systems, the respective name being displayed to the user.

4. The method of claim 1, wherein a life cycle of the FLR session is controlled by a plurality of timers.

5. The method of claim 1, further comprising providing a token to the user to allow the user to access the folder of the second virtual machine in the FLR session.

6. The method of claim 1, wherein restoring the one or more files includes browsing or downloading the one or more files.

7. The method of claim 1, wherein restoring the one or more files includes restoring the one or more files without restoring the entire backup of the first virtual machine.

8. An apparatus for providing file level restore (FLR) service for restoring one or more files stored in a plurality of file systems in a backup of a first virtual machine, the apparatus comprising a processor and a memory storing executable instructions that, in response to execution by the processor, cause the apparatus to at least:
 receive a request from a user to restore the one or more files stored in the plurality of file systems in the backup of the first virtual machine;
 create a FLR session for the user, including causing the apparatus to:
  create a virtual disk file in a second virtual machine providing the FLR service, the virtual disk file including an empty file system being mounted as a root folder of a virtual appliance in the second virtual machine;

create a respective folder for each of the plurality of file systems under the root folder;
mount each of the plurality of file systems to the respective folder; and
mount the root folder to a folder of the second virtual machine;
wherein the FLR session enables restoring the one or more files by the user through accessing the folder of the second virtual machine in the FLR session.

9. The apparatus of claim 8, wherein the first virtual machine and the second virtual machine are deployed in a cloud.

10. The apparatus of claim 8, wherein creating the respective folder for each of the plurality of file systems includes generating a respective name for each of the plurality of file systems, the respective name being displayed to the user.

11. The apparatus of claim 8, wherein a life cycle of the FLR session is controlled by a plurality of timers.

12. The apparatus of claim 8, wherein the apparatus is further caused to provide a token to the user to allow the user to access the folder of the second virtual machine in the FLR session.

13. The apparatus of claim 8, wherein the FLR session enables restoring the one or more files by the user to browse or download the one or more files.

14. The apparatus of claim 8, wherein the FLR session enables restoring the one or more files without restoring the entire backup of the first virtual machine.

15. An apparatus for restoring one or more files stored in a plurality of file systems in a backup of a first virtual machine, the apparatus comprising:
means for receiving a request from a user to restore the one or more files stored in the plurality of file systems in the backup of the first virtual machine;
means for creating a FLR session for the user, including:
means for creating a virtual disk file in a second virtual machine providing the FLR service, the virtual disk file including an empty file system being mounted as a root folder of a virtual appliance in the second virtual machine;
means for creating a respective folder for each of the plurality of file systems under the root folder;
means for mounting each of the plurality of file systems to the respective folder; and
means for mounting the root folder to a folder of the second virtual machine;
wherein the FLR session enables restoring the one or more files by the user through accessing the folder of the second virtual machine in the FLR session.

16. The apparatus of claim 15, wherein the first virtual machine and the second virtual machine are deployed in a cloud.

17. The apparatus of claim 15, wherein means for creating the respective folder for each of the plurality of file systems includes means for generating a respective name for each of the plurality of file systems, the respective name being displayed to the user.

18. The apparatus of claim 15, wherein a life cycle of the FLR session is controlled by a plurality of timers.

19. The apparatus of claim 15, wherein the apparatus is further caused to provide a token to the user to allow the user to access the folder of the second virtual machine in the FLR session.

20. The apparatus of claim 15, wherein the FLR session enables restoring the one or more files without restoring the entire backup of the first virtual machine.

* * * * *